Oct. 17, 1967          B. H. VINSON          3,348,216

METHOD AND CIRCUITS FOR STORING ELECTRICAL ENERGY

Filed Dec. 9, 1963          3 Sheets-Sheet 1

INVENTOR
BILLY H. VINSON
BY
Elliott & Pastoriza
ATTORNEYS

United States Patent Office 3,348,216
Patented Oct. 17, 1967

3,348,216
METHOD AND CIRCUITS FOR STORING
ELECTRICAL ENERGY
Billy H. Vinson, Granada Hills, Calif.
(640 Jordan St., Escondido, Calif. 92025)
Filed Dec. 9, 1963, Ser. No. 328,926
7 Claims. (Cl. 340—173)

This invention relates to a novel method and circuits for storing or "memorizing" the value of an electrical quantity at a given instant of time. The stored electrical quantity may take the form of a voltage or a current. Essentially, the method and circuits of this invention enable the reproduction or measuring of the "memorized" electrical quantity hours or even days after being stored.

Several well known circuits are presently available for storing or "memorizing" voltages or currents. Many of these circuits operate on a binary digital principle in that they contain a plurality of storage elements each capable of assuming two states. With this arrangement, an analog to digital converting circuit is required for receiving the input voltage or current to be "memorized." At the instant of time the input signal is to be memorized, it is converted to a digital binary code which in turn actuates the various two state memory elements in the circuit.

Read-out from the circuit at some later date then requires a reconversion of the digital state of the various memory elements to an analog voltage or current.

Other known memory circuits such as for memorizing voltages, by way of example, may constitute simple storage means in the form of a condenser. A condenser storage circuit is capable of receiving directly input voltages in analog form. However, there is no presently known way to prevent leakage from the condenser so that the storage time of the voltage is relatively short. In many applications, a short storage time is all that is required and thus the simple storage condenser means of memorizing has wide applications. However, there are instances in which it would be desirable to enable storage of an analog voltage or current over a relatively long period of time such as days or weeks, and then provide an immediate read-out in the form of an analog signal of the value of voltage or current stored.

With the foregoing in mind, it is accordingly a primary object of this invention to provide a novel method and novel circuits for storing or "memorizing" electrical quantities such as voltages or currents in which analog to digital and digital to analog converters are not necessary and yet in which the electrical quantity in question may be stored for any desired length of time.

More particularly, it is an object to provide a novel method and novel circuits for storing the value of an electrical voltage in the form of an analog signal at any desired instant of time and maintaining the stored voltage at its original value for days or weeks and in which read-out from the circuit will reproduce the initial voltage value with the same degree of accuracy as would occur if read-out were effected at any earlier time.

A more general object of this invention is to provide a circuit for storing electrical energy over a long period of time in a more economical manner than has been possible with circuits available heretofore capable of performing a similar function.

In accordance with the method of the invention, input analog voltage or a current is stored at a given instant in time to provide a given value of stored voltage or current. In the next step of the method, the stored voltage or current changes from the given value.

In the case of a stored voltage, the method of carrying out the restoring of the voltage to its original given value includes the steps of periodically providing a time period constituting a function of the stored voltage. This time period may be provided by comparing the stored voltage periodically with a ramp voltage adapted to change as a function of time. A number of time intervals is provided during this period so that the number will be a function of the stored voltage since the time period is a function of the stored voltage. An increment of voltage is then added to the stored voltage whenever its value, at the time the ramp voltage exceeds the stored voltage, decreases to a given voltage level less than the given value.

The circuits for carrying out the foregoing method in accordance with the invention, include storage means for receiving and holding a given value of voltage corresponding substantially to the applied voltage to be memorized as a stored voltage. A varying or ramp generator adapted to provide a ramp voltage changing from zero to a value higher than any contemplated stored voltage is provided and compared to the stored voltage in a voltage comparator. The voltage comparator provides a comparator pulse whenever the ramp voltage corresponds to or exceeds the stored voltage. A time period is thus defined between the time the ramp voltage starts to the time it corresponds with the stored voltage, and this time period is thus a function of the value of the stored voltage.

Cooperating with the foregoing elements is a recharge circuit connected to the storage means, a pulse generating means responsive to the comparator pulse to provide an actuating pulse for this recharge circuit, and a gate means connected between the pulse generating means and the recharge circuit. A timing means provides a number of clock pulses during the referred to time period to provide a number of time intervals during this period. The gate means is continuously alternately opened and closed during these intervals by the timing means so that the gate means is closed at alternate time intervals to block the actuating pulse. However, when the stored voltage decreases slightly, the point in time at which the ramp voltage exceeds the stored voltage is shifted so that the time period is decreased and the number of time intervals decreased. When the time decrease is such as to decrease the number of time intervals by at least one time interval, the resulting comparator pulse and thus the actuating pulse are shifted in time to a position corresponding to a time interval at which the gate means is open. When the gate means is open, the actuating pulse is passed through the gate means to actuate the recharge circuit and replenish the stored voltage by adding a given increment of voltage so that its value is returned to its given value.

The circuit thus maintains a stored voltage at a desired given value by replenishing the stored voltage automatically but only at such times as the stored voltage drops to a given voltage level established below its initial given value. Since this recharging or replenishing of the stored voltage is effected automatically, the stored voltage will always be maintained substantially at its given initial value to an accuracy corresponding to the value of the added increment of voltage. The length of time that the voltage is stored is of no consequence as to the accuracy of the read-out because of this unique method and circuit for automatically replenishing the storage means.

A better understanding of the method and circuits of this invention will be had by now referring to the accompanying drawings, in which.

Figure 1:
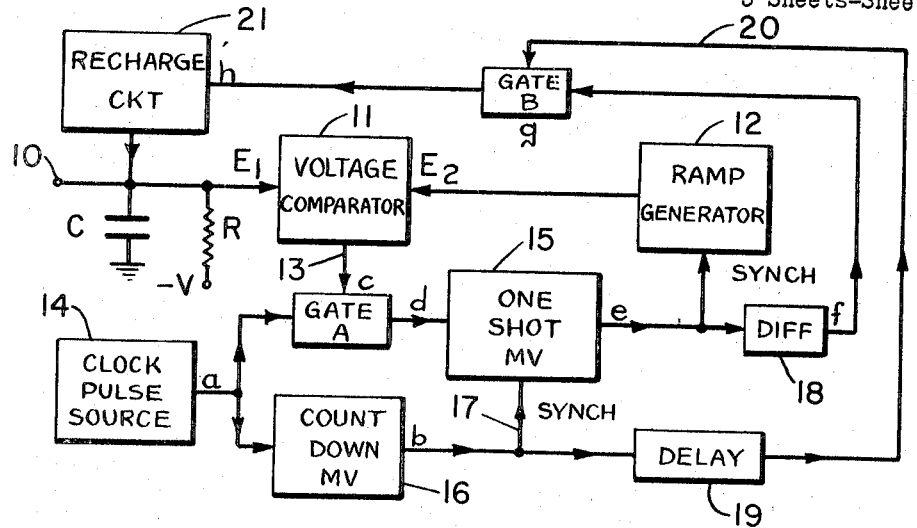
FIGURE 1 is a basic block diagram of a first embodiment of the invention for memorizing a given voltage value.

Referring first to FIGURE 1, there is shown a voltage memory circuit having an input terminal 10 for receiving an analog voltage and storing the voltage on a storage condenser C in the form of a "stored" voltage E1.

The input voltage value E1 is also applied to a voltage comparator 11 for comparison with a ramp voltage E2 supplied from a ramp generator 12. The voltage comparator 11 will provide a comparator pulse from line 13 to a gate A whenever the ramp voltage E2 corresponds to or exceeds the stored voltage E1. Timing means including a clock pulse source 14 is connected to the gate A so that a clock pulse will pass through the gate A when it is opened. This clock pulse in turn triggers a one-shot multivibrator 15 connected to the ramp generator 12.

The clock pulse source 14 also connects to a count-down multivibrator 16 functioning as a synchronizing means through line 17 for the one-shot multivibrator 15. The arrangement is such that an actuating pulse may be derived from the wave form from the one-shot multivibrator 15 by means of a differentiating circuit 18 at a fixed point in time measured from the beginning of each ramp voltage generated by the ramp generator 12. This actuating pulse is passed to a gate B. Gate B in turn is arranged to be alternately periodically opened and closed by a controlling square wave form from the count-down multivibrator 16 passing through a delay 19 to line 20 connecting to the gate. If gate B is open at the time the actuating pulse from the differentiator 18 is passed thereto, this pulse will pass through the gate to actuate a recharge circuit 21. The recharge circuit 21 in turn serves to replenish the stored voltage on the condenser C by adding an increment of voltage thereto each time it is actuated.

The manner in which the above described components cooperate together to maintain a substantially fixed storage voltage on the condenser C will now be described in greater detail with reference to the various wave forms in FIGURE 2. These wave forms are lettered and correspond substantially to the wave forms existing at the correspondingly lettered portions of the block diagram of FIGURE 1.

Figure 2:
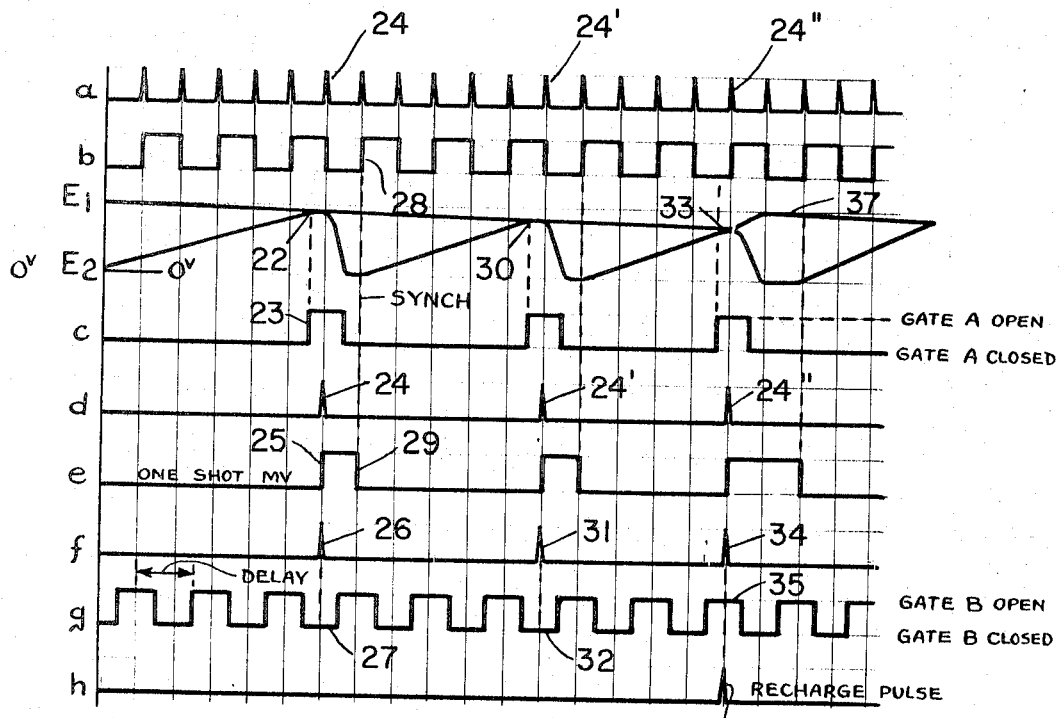
FIGURE 2 represents a series of wave forms and circuit states as functions of time occurring in the circuit of FIGURE 1.

Referring to the upper wave form $a$ in FIGURE 2, there are shown clock pulses derived from the clock pulse source 14 of FIGURE 1. The output $b$ from the count-down multivibrator 16 in turn is indicated below the clock pulses in the form of square waves. The leading and trailing edges of these square waves coincide in time with the clock pulses. The stored voltage on the condenser C is indicated at E1 at a given level above 0 volt which gradually decreases as a consequence of leakage from the condenser C. Also illustrated is the ramp voltage E2 plotted with reference to the same 0 volt level as the input or stored voltage E1.

The wave form $c$ represents the period of time during which the gate A is opened and closed and the wave form $d$ illustrates clock pulses passed through the gate A when opened.

The output $e$ of the one-shot multivibrator 15 is illustrated wherein it will be noted that the leading edge of the wave form is triggered by the pulses $d$. $f$ illustrates the differentiated pulses resulting from the differentiation by the circuit 18 of the leading edge of the one-shot multivibrator wave forms, and $g$ symbolically represents the periods of time during which the gate B is opened and closed. Finally, $h$ represents a recharge pulse which is only applied to the recharge circuit 21 of FIGURE 1 when one of the actuating pulses resulting from the differentiation arrives at the gate B when the same is open.

In the operation of the basic block diagram, assume that the voltage E1 shown in FIGURE 2 is initially applied to the input terminal 10. This voltage will be stored on the condenser C but because of leakage through the resistance R and small negative voltage source V which is purposely applied to the circuit, the voltage E1 stored on the condenser C will gradually decrease, as indicated by the slight slope to the line E1.

The ramp voltage E2 is compared with the voltage E1 in the voltage comparator 11. At a point in time at which the ramp voltage exceeds the stored voltage, such as indicated at 22 in FIGURE 2, a comparator pulse will be generated by the voltage comparator circuit 11 and serve to open the gate A as indicated at 23. When the gate A is open, the next generated clock pulse 24 will be passed by the gate 23 as indicated at $d$. This clock pulse 24 in turn triggers the one-shot multivibrator 15 so that the leading edge 25 of the one-shot multivibrator wave form is synchronized with the clock pulse 24.

The leading edge 25 from the one-shot multivibrator is differentiated by the differentiating circuit 18 to provide the actuating pulse 26. It will be noted that the actuating pulse 26 has arrived at the gate B at a point in time at which this gate is closed as indicated at 27. Therefore, the actuating pulse 26 will not be passed to the recharging circuit 21 and no recharging increment of voltage will be applied to the condenser C.

The termination of the one-short multivibrator wave form illustrated at $e$ is effected by the positive going leading edge 28 of the count-down multivibrator square wave In other words, the one-shot multivibrator 15 wave form is only terminated when a positive going portion of the wave form from the count-down multivibrator 16 is received therein through the synchronizing line 17. This termination of the one-shot multivibrator wave from is indicated at 29 and serves to synchronize the ramp generator 12 so that a new ramp voltage will commence at this instant in time. The period of the one-shot multivibrator 15 is sufficient to permit the ramp voltage E2 to return to a 0 voltage before commencing a new ramp. Resetting of the ramp generator to its 0 voltage level is effected upon generation of the comparator pulse in the voltage comparator 11.

When the second ramp voltage intersects the stored voltage E1 as indicated at 30, the various sequence of events are repeated and it will be noted that the point in time at which this intersection occurs is such that the clock pulse 24' is passed by the gate A. The differentiated leading edge of the one-shot multivibrator indicated at 31 is still positioned at a time when the gate B is closed as indicated at 32 so that still no actuating pulse is passed to the recharge circuit 21.

The next ramp voltage sweep intersects the stored voltage E1 at 33 and by this time the stored voltage has decreased to a given voltage level such that the clock pulse 24" is passed by the gate A. This pulse initiates operation of the one-shot multivibrator 15 to provide a differentiated actuating pulse 34 in a position in time when the gate B is open, as indicated at 35. The actuating pulse 34 can thus pass through the gate resulting in a recharging pulse 36 for actuating the recharge circuit 21. Actuation of the recharge circuit 21 will then provide an increment of voltage to the condenser C to raise the input voltage E1 to a value as indicated at 37. The various sequence of operations will then repeat, the ramp voltage periodically being compared with the input voltage E1.

It will be clear that the ramp voltage defines a time period which is a function of the stored voltage in that a decrease in the stored voltage decreases the time period. Thus, the time period between the time the ramp voltage starts at 0ᵛ and reaches the value of the stored voltage as at 22, 30, and 33 slowly decreases. The clock pulses define time intervals during this time period, these intervals corresponding to the times that gate B alternately opens and closes. Thus, a decrease in the time period decreases the total number of time intervals in the time period and when the number of time intervals decreases by at least one time interval the gate B changes from a closed to open condition to pass the recharge pulse 36.

It will be evident from the foregoing description that the stored voltage may be held within very close limits to its initial given value. The clock pulses may be of the order of 0.25 microsecond apart so that the actual decrease in the stored voltage must be no greater than that which corresponds to the change in ramp voltage in a 0.25 microsecond period. This condition can be easily realized.

In the foregoing description, it was assumed that the initial ramp voltage intersected the input voltage E1 at a point 22 such that the first actuating pulse provided would be passed to the gate 20 when the gate was closed. It is possible, however, that the intersection of the ramp voltage with the input voltage E1 could occur at a time such that the actuating pulse 26 would appear at the gate B when the gate was open. In this event, a recharge pulse would be immediately passed to the condenser C, thus raising the stored voltage slightly higher than that initially applied. In this case, the next time the ramp voltage intersects the voltage E1, there would result an actuating pulse occurring at a point in time when the gate B is closed so that no further recharging increment of voltage will be applied to the condenser C. The ramp generator will then continue to operate as described in conjunction with FIGURE 2 until such time as the voltage drops a small incremental value so that the actuating pulse arrives at the gate B at a time when it is open, thereby providing a further recharge pulse to restore the voltage to a value to which it was originally charged in response to the first recharge increment of voltage rather than to the initially applied value.

As a consequence of the foregoing, it will be evident that the stored voltage will be maintained at a value which fluctuates slightly above the given value of voltage initially provided. Alternatively, the stored voltage may be maintained at a value of voltage which fluctuates slightly below the given value of voltage first applied as is the case when the first actuating pulse is blocked by the gate B. Since the small increment of voltage above and below the actual value of the received voltage corresponds to the voltage change which occurs in the ramp voltage between two successive clock pulses, if this value were 5 millivolts, the over all resolution could vary as much as 10 millivolts.

It would be desirable in the case of clock pulses defining 5 millivolt voltage levels, however, to provide a circuit which will maintain the stored voltage at its value within a total range of 5 millivolts. Such could be accomplished if it could be assured that at the first intersection of the ramp voltage with the applied input voltage, an actuating pulse always occurred at the time the gate was closed so that a maximum decrease of 5 millivolts would be the only amount that would be necessary to insure a recharge pulse.

Figure 3:
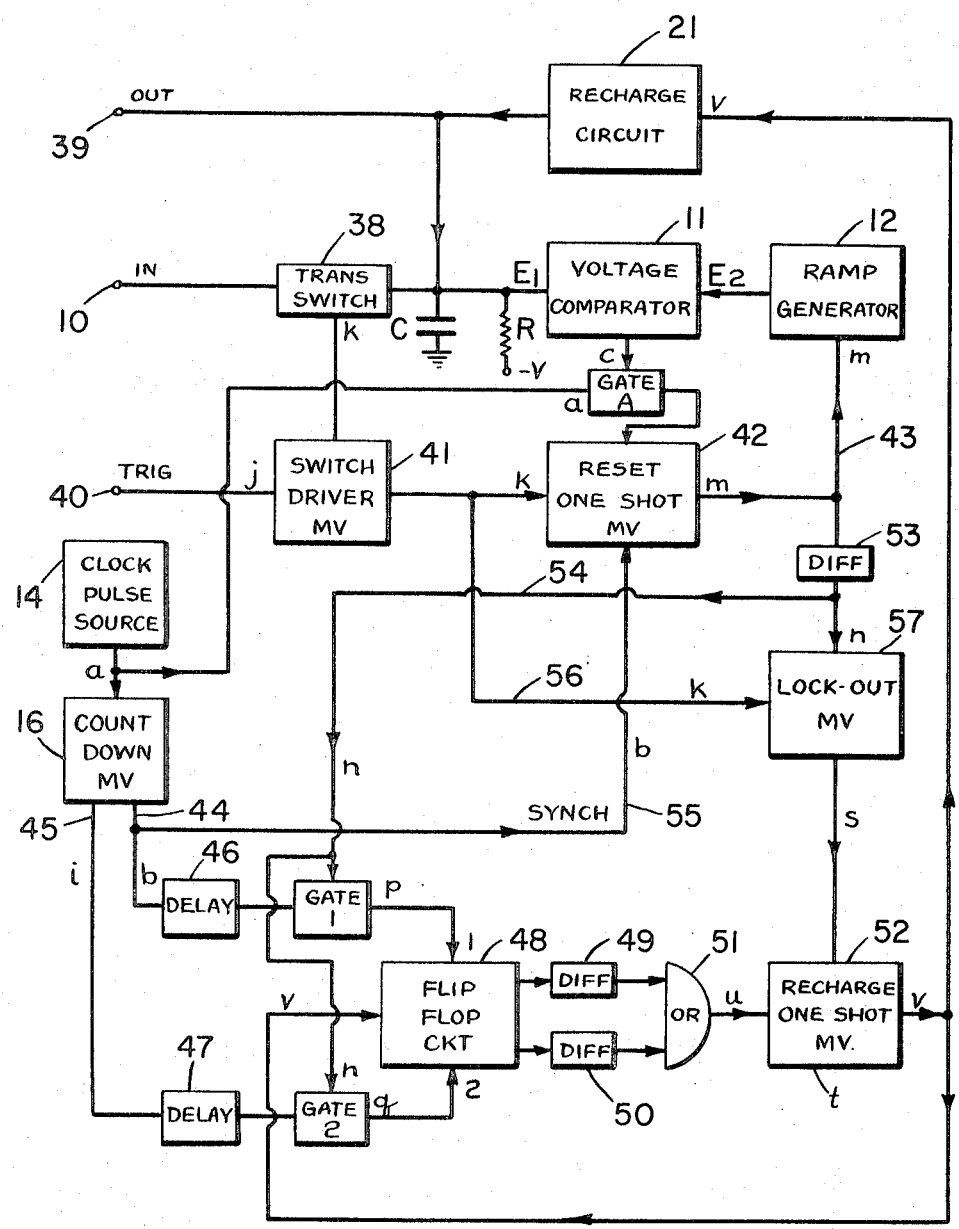
FIGURE 3 illustrates a second embodiment of a voltage memory circuit for providing a greater resolution than is possible with the circuit of FIGURE 1; and, FIGURE 4 illustrates a series of wave forms and circuit states occurring in the block diagram of FIGURE 3 useful in explaining the operation of the circuit.

Such a doubling of the resolution of the circuit can be achieved by employing the circuit illustrated in FIGURE 3 wherein the gate means essentially consists of two gates, one of which is open when the other is closed, and closed when the other is open. This latter circuit will now be described in detail.

In FIGURE 3, component blocks which are identical to those described in conjunction with FIGURE 1 are identified by the same numerals. A varying or analog type input voltage is applied to the input 10. This input voltage is fed through a transistor switch 38 directly to the storage condenser C and voltage comparator 11 as a voltage E1. An output terminal 39 connects to the condenser C so that when the transistor switch 38 is on or in condition to provide a straight through connection from the input terminal 10 to the condenser C, the output voltage 39 will simply follow the input voltage wave form.

When it is desired to "freeze" or "memorize" the value of the input voltage at a given instant in time, a trigger pulse is applied to a terminal 40 illustrated beneath the input terminal 10. This trigger pulse actuates a switch driver multivibrator 41 to turn the transistor switch 38 off so that the applied voltage at the input 10 is then isolated from the condenser C and the condenser C will hold the voltage value at the instant of time that the transistor switch 38 is turned off.

As in the case of the embodiment of FIGURE 1, there is provided a clock pulse source 14 for passing clock pulses through a count-down multivibrator 16 and also through a gate A receiving a comparator pulse from the voltage comparator 11. The ramp generator 12 provides a voltage E2 to the voltage comparator 11 as in the embodiment of FIGURE 1.

A reset one-shot multivibrator 42 is arranged to receive one of the clock pulses from the gate A when the same is actuated by a comparator pulse and also is set in an operating condition when the switch driver multivibrator 41 is actuated. The output from the reset one-shot multivibrator passes to the ramp generator 12 through a branch line 43 for synchronization purposes.

Referring now to the left portion of the drawing of FIGURE 3, both outputs 44 and 45 from the count-down multivibrator 16 are employed to operate gate means including delay circuits 46 and 47 and first and second gates 1 and 2. Since the two outputs from the count-down multivibrator are 180 degrees out of phase, gate 1 will be open when gate 2 is closed and gate 1 will be closed when gate 2 is open. The outputs from these gates connect to a flip-flop circuit 48 which will assume first and second states depending upon which side 1 or 2 receives a pulse. When the flip-flop circuit 48 changes states, output pulses will be passed through one or the other of the first and second differentiators 49 and 50 to an "or" circuit 51 from which will emerge one or the other of the pulses regardless of which input of the "or" circuit receives pulses. The output from the "or" circuit connects to a recharge one-shot multivibrator 52 in turn connecting to the recharge circuit 21 shown in the upper portion of the drawing for adding a voltage increment to the stored voltage on the condenser C.

Essentially, the first and second gates 1 and 2, the flip-flop circuit 48, differentiating circuits 49 and 50, "or" circuit 51, and recharge one-shot multivibrator 52 function as an overall gate means for passing an actuating pulse to the recharge circuit 21. This actuating pulse is derived from the output of the reset one-shot multivibrator 42 through a differentiating circuit 53 and lead 54. The output from the differentiating circuit 53 is applied simultaneously to both the gates 1 and 2 as shown.

A synchronizing line 55 is taken from one output such as 44 from the count-down multivibrator 16 to the reset one-shot multivibrator. The initial pulse from the switch driver multivibrator 41 is supplied through line 56 to a lock-out multivibrator 57. This lock-out multivibrator also receives the pulse from the differentiating circuit 53. Finally, there is provided a resetting line 52' from the output of the recharge one-shot multivibrator 52 to the flip-flop circuit for resetting the flip-flop circuit to one or the other of its stages when a pulse is provided from the output of the recharge one-shot multivibrator 52.

Figure 4:
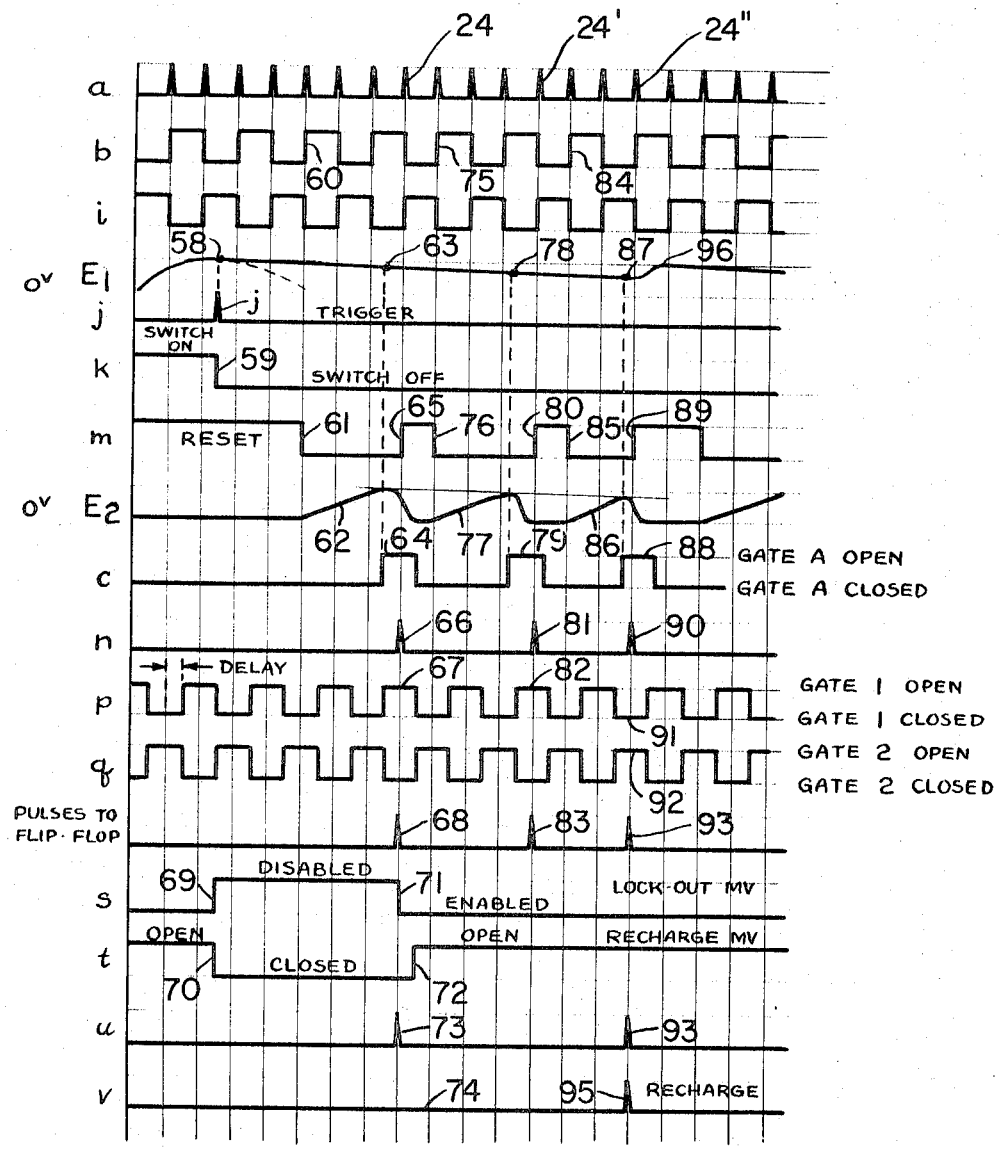

The manner in which the circuit of FIGURE 3 operates will now be evident by referring to the various wave forms illustrated in FIGURE 4. These wave forms are lettered and exist at the correspondingly lettered points on the block diagram of FIGURE 3. Thus, the wave form $a$ illustrates the clock pulses and the wave form $b$ illustrates the output from side 44 of the count-down multivibrator 16 corresponding to the output wave form $b$ illustrated in FIGURE 2. The other output 45 from the count-down multivibrator is indicated at $i$.

The analog type input voltage E1 is illustrated as slowly increasing and it is assumed that at a given instant of time, the transistor switch 38 of FIGURE 3 is turned off so that the input voltage is then isolated from the remaining portion of the circuit and the value of the input voltage E1 at the instant of time the transistor switch is operated will be in the form of a stored voltage on the condenser C. *j* represents the trigger pulse applied to the switch driver multivibrator 41 of FIGURE 3. *k* in turn symbolically represents the state of the transistor switch 38 wherein the sudden drop in level indicates the switch is turned from on to off. *m* illustrates schematically the output from the reset one-shot multivibrator 42 of FIGURE 3 and E2 represents the ramp voltage from the ramp generator 12. The wave form *c* symbolically represents the periods of time when the gate A is opened and closed and in this respect corresponds to the wave form *c* of FIGURE 2. *n* represents the differentiated wave form from the reset one-shot multivibrator appearing at the output of the differentiating circuit 54 of FIGURE 3, and *p* and *q* symbolically represents the periods in time when the first and second gates 1 and 2 are opened and closed. Below the wave form *q* are illustrated various pulses passed to the flip-flop 48.

The wave forms *s* and *t* represent schematically the functioning of the lock-out multivibrator and the recharge one-shot multivibrator respectively. *u* illustrates actuating pulses passed to the recharge one-shot multivibrator 52 and *v* represents an actuating recharge pulse passed to the recharging circuit 21 for replenishing the stored voltage on the condenser C.

With the foregoing brief description of the wave forms in mind, assume in the operation of the circuit of FIGURE 3, that the transistor switch 38 is turned off at an instant of time at which it is desired to "memorize" the value, as at 58, of the input voltage E1 applied to the input terminal 10. This switching, as described heretofore, is effected by applying a trigger at the desired instant in time to the trigger input terminal 40 to the switch driver multivibrator 41. Operation of the switch driver multivibrator 41 will turn the transistor switch 38 from its on condition to its off condition as shown at 59 in FIGURE 4. The voltage level at 58 represents the stored voltage to be maintained or memorized.

The operation of the switch driver multivibrator 41 allows the reset one-shot multivibrator 42, which was held in the on state by the multivibrator 41, to commence its operation. Termination of the wave form of the reset one-shot multivibrator after its timing period is synchronized through the line 55 in FIGURE 3 with the positive going edge of the output from the count-down multivibrator *b* indicated at 60 in FIGURE 4. Thus, the turning off of the reset one-shot multivibrator is indicated at 61 in time alignment with the positive going edge 60 of the wave form *b*.

As in the case of the embodiment of FIGURE 1, termination of the operation of the reset one-shot multivibrator serves to trigger the ramp generator 12 to commence the generation of a ramp voltage as indicated at 62. This ramp voltage will continue unitil it exceeds the value of the input voltage E1 as indicated at the point 63. At this point in time, a comparator pulse will be generated and passed to the gate A to open the gate as indicated at 64. The next available clock pulse applied to the gate A from the clock pulse source 14 of FIGURE 3 is indicated at 24 in FIGURE 4 and will pass to the reset one-shot multivibrator 42 to turn on the reset one-shot multivibrator as indicated by the leading edge 65.

The leading edge 65 from the reset one-shot multivibrator in turn passes to the differentiating circuit 53 to provide a differentiating output pulse 66 on line 54 indicated at the wave form *n*. This differentiated pulse 66 is passed simultaneously to both the first and second gates 1 and 2. For the particular initial input voltage value chosen to be memorized, the pulse 66 appears in time at a point when the gate 1 is opened, as indicated at 67 and when the gate 2 is closed. The pulse 66 will thus pass through gate 1 to actuate the flip-flop circuit 48 and place it in a first state corresponding to the numeral 1 in FIGURE 3. If the flip-flop circuit already happens to be in this state, the pulse from the gate 1 has no effect.

Referring to the wave form *s* of FIGURE 4, the lock-out multivibrator 57 is arranged to be energized as indicated by the leading edge 69 by the pulse from the switch driver multivibrator 41 passing through the line 56. Energization of this lock-out multivibrator serves to disable the recharge one-shot multivibrator 52 as indicated by the vertical line 70 for the wave form *t*. The length of time that the lock-out multivibrator operates is such that the recharge one-shot multivibrator 52 will be disabled until the first pulse 66 at *n* occurs which resets the lock-out multivibrator as at 71 to open as at 72 the recharge one-shot multivibrator circuit. There is a sufficient delay however so that any pulse such as 73 at *u* will be blocked. However, after this first pulse is received at the gate 1, the period for the lock-out multivibrator is completed, as indicated at 71 to open the recharge one-shot multivibrator 52 so that it is then free to pass any pulses received from the flip-flop and "or" circuits 48 and 51. The wave form *u* at 73 represents the generated pulse as a consequence of operation of the flip-flop circuit wherein it is assumed that the circuit was in state 2 when the pulse from the gate 46 was received at terminal 1. As indicated by the output 74 from the recharge one-shot multivibrator 52, there is no pulse passed to the recharge circuit since the recharge one-shot multivibrator has been disabled.

Referring again to the wave form *b* from the count-down multivibrator, as in the case of the embodiment of FIGURE 1, a positive upwardly going edge such as indicated at 75 provides a synchronization to the reset multivibrator 42 to turn this reset off as indicated at 76. When the reset multivibrator completes this period as indicated at 76, it triggers the ramp generator to commence generation of a new ramp 77. This operation is similar to the one-shot multivibrator of the circuit of FIGURE 1, wherein it was synchronized to the ramp generator to commence the generation of the ramp when its wave form terminated.

The next ramp 77 will continue until it has a value which exceeds the value of the input voltage E1 which has now slightly dropped in value. The intersection point is indicated at 78 and again a comparator pulse will be provided which operates the gate A to permit the next available clock pulse 24' to pass to the reset multivibrator and turn it on again as indicated by the leading edge 80. This leading edge is again differentiated to provide a differentiated pulse 81 applied to the first and second gates 1 and 2. Again, however, it will be noted that the gate 1 is open as indicated at 82 and the gate 2 closed so that another pulse 83 will be applied to the flip-flop side 1. Since the flip-flop circuit is already in state 1, this pulse will have no effect. There is no output pulse from the "or" circuit as indicated by the graph *u* corresponding to the pulse 83 since the flip-flop has not changed state. There is thus no actuating pulse passed to the recharge one-shot multivibrator and recharging circuit 21.

Referring again to the count-down multivibrator wave form *b* it will be noted that the next positive upwardly going edge 84 will now serve to turn off the reset multivibrator as indicated at 85 and thereby commence generation of a third ramp voltage 86. By this time, the input voltage E1 has decreased to the extent that the intersection of the ramp voltage with the stored voltage at 87 occurs at a point in time such that the gate A is open at 88 to pass an earlier clock pulse 24". This clock pulse 24" again starts operation of the reset multivibrator as indicated by the leading edge 89, this edge then being differentiated to provide the differentiated pulse 90.

The differentiated pulse is applied to both the gates 1 and 2 but as a consequence of its shift in position in time, the gate 1 is now closed as indicated at 91 and the gate 2 is open as indicated at 92. As a result, the flip-flop circuit 48 will be caused to flip to state 2 resulting in an output pulse 94 indicated at *u* in FIGURE 4. This output pulse can now be passed by the recharge one-shot multivibrator 52 to pass an actuating pulse 95 to the recharge circuit 21 and result in an increment of voltage being added to the storage condenser C. This same actuating pulse 95 from the recharge one-shot multivibrator 52 also passes along the reset line 52' to the input of the flip-flop circuit to change its state from 2 back to state 1. The recharge one-shot multivibrator 52 is designed such that it will not be effective to pass a pulse for a short delay after any one pulse has passed therethrough so that another pulse appearing at the output of the "or" circuit as a consequence of resetting the flip-flop circuit will not be passed by the recharge one-shot multivibrator 52. However, the resetting of the flip-flop circuit will again place it in its initially set state or in state 1.

The actuating pulse 95 passed to the recharge circuit 21, as stated, results in an increment of voltage being added to the stored voltage E1 to raise this voltage E1 as shown at 96. This value corresponds within the resolution of the system, substantially to the value at the point 58 at which the system was turned on to memorize this particular value of voltage.

The foregoing process is then repeated and it will be clear that recharging or adding of incremental voltages to the condenser will only occur when the stored voltage has dropped to a value at which the point in time of its intersection with the ramp voltage occurs when the gate 2 is open and the gate 1 closed.

In the vent that the switch driver multivibrator 41 were actuated to operate the transistor switch 38 at a point in time so that the first actuating pulse would arrive at the gates 1 and 2 when the gate 1 was closed and the gate 2 open, then the initially set state of the flip-flop circuit 48 would have been state 2. In this event, the same situation would obtain as before except that a recharge pulse would be applied to the recharging circuit 21 only when the gate 1 was open and the gate 2 closed so that the flip-flop switched from its state 2 to its state 1. The reset pulse on line 52' would then function to return the flip-flop from state 1 to state 2. In this respect, it should be recalled that the function of the lock-out multivibrator is simply to prevent the recharge one-shot multivibrator 52 from passing any pulses to the recharge circuit until the flip-flop circuit 48 has been set in one state or the other. Thereafter, the only pulses that would pass to the recharge circuit 21 would be those which would result in a change of state of the flip-flop circuit 48 from its initially set state.

By the foregoing arrangement of two gates and a flip-flop circuit, it will be evident that a voltage resolution superior to that realizable with the circuit of FIGURE 1 is provided. Thus, regardless of which point in time the input voltage is "memorized" the recharge circuit will commence operating whenever this stored voltage drops sufficiently to result in a gate being opened to pass the actuating pulse to the recharge circuit.

As stated heretofore, in the embodiments of FIGURES 1 and 2, the stored input voltage could settle at either a higher or lower value from the initially applied value. This result is a consequence of there being provided only a single gate for the application of the actuating signal to the recharging circuit, this gate being open on either side of a closed condition. In the embodiment of FIGURES 3 and 4, the two gates working 180 degrees out of phase, doubles the resolution of the system since there is no instance in which there is an ambiguity as to which direction the stored voltage will move.

From the foregoing description, it will be evident that the present invention has provided a novel method as well as novel circuits for storing electrical energy such as a voltage. While the preferred embodiments of the invention have been described in conjunction with the storing of a voltage, it should be understood that the method and certain portions of the circuit are equally applicable to the storing of other electrical quantities such as current. The method and circuits for storing electrical energy are therefore not to be thought of as limited to the specific embodiments set forth merely for illustrative purposes.

What is claimed is:

1. A voltage memory circuit for holding an arbitrary input voltage at a given value corresponding substantially to its value when applied to said circuit, comprising, in combination: storage means receiving said given value of voltage and holding it as a stored voltage; a ramp generator adapted to provide a ramp voltage varying from zero to a value higher than any contemplated stored voltage; a voltage comparator connected to said storage means and said ramp generator and adapted to provide a comparator pulse when said ramp voltage exceeds said stored voltage; a recharge circuit connected to said storage means; pulse generating means responsive to said comparator pulse to provide an actuating pulse for said recharge circuit; gate means connected between said pulse generating means and said recharge circuit; and timing means for continuously opening and closing said gate means to define successive time intervals whose total number varies in accordance with the value of the stored voltage whereby said gate means is closed at given times to block said actuating pulse, a decrease in said storage voltage to a value a given voltage increment below said given value shifting the time that said ramp voltage exceeds said stored voltage to a position in time at which said gate means is open so that said actuating pulse is passed through said gate means to actuate said recharge circuit and replenish said stored voltage to a value corresponding substantially to its given value.

2. A memory circuit according to claim 1, in which said pulse generating means includes a one-shot multivibrator responsive to said timing means and said comparator pulse to provide a wave form; and differentiating means receiving said wave form and differentiating the leading edge thereof to provide said actuating pulse.

3. A memory circuit according to claim 2, in which said gate means comprises first and second gates both simultaneously receiving said actuating pulse, said timing means being connected to said gates to open said first gate when said second gate is closed and close said first gate when said second gate is open; a flip-flop circuit having first and second states connected to the outputs of said first and second gates, the first actuating pulse derived from said one-shot multivibrator after application of said input voltage to said storage means setting said flip-flop circuit in one of its states by passing through the one of said first and second gates which was open at the time of generation of said actuating pulse, the next received actuating pulse being blocked by said flip-flop circuit unless it is received at a position in time to pass through the other of said gates, said flip-flop changing its state to actuate said recharge circuit only when said actuating pulse is received through said other of said gates; and a flip-flop reset connection for returning said flip-flop circuit to its one state whenever said recharge circuit is actuated.

4. A memory circuit according to claim 3, including a lock-out means for preventing actuation of said recharge circuit only with respect to said first actuating pulse, whereby said flip-flop may be established in said one state before any replenishing of said stored voltage occurs.

5. A method of holding an arbitrary voltage at a given value corresponding substantially to its value at a given instant, comprising the steps of: storing said voltage at said given instant; periodically providing a time period constituting a function of said stored voltage; providing a number of time intervals during said period so that when said stored voltage changes, said number of said time intervals in said time period changes; and adding an increment of voltage to said stored voltage only when said number of time intervals in said time period changes by at least one time interval, to restore the value of said stored voltage to said given value.

6. A method according to claim 5, in which said time period is provided by the steps of: generating a varying voltage changing as a function of time; and comparing said varying voltage with said stored voltage such that the period from the time said varying voltage starts from one known value to the time it corresponds in value to said stored voltage defines said time period; and in which said time intervals are defined by the step of generating a series of clock pulses during said time period.

7. A voltage memory circuit for holding an arbitrary input voltage at a given value corresponding substantially to its value when initially applied to said circuit, comprising, in combination: storage means receiving said given value of voltage; means for generating a time period constituting a function of said stored voltage; a gate means; means for alternately opening and closing said gate means at successive time intervals during said time period so that the number of time intervals in said time period is a function of the value of said stored voltage, a change in said value of stored voltage by a given voltage increment changing the total number of time intervals in said time period by one time interval to change said gate means from a closed to open condition; an actuating pulse generating means connected to the input of said gate means and generating an actuating pulse only at the end of said time period in response to said varying voltage exceeding said stored voltage; and means connected to the output of said gate means responsive to said actuating pulse when received through said gate means when said gate means is open to add voltage to said stored voltage whereby whenever said stored voltage changes by said given voltage increment it is restored to said given value by the addition of said voltage.

References Cited
UNITED STATES PATENTS 2,832,887    4/1958    Kirshner.
3,141,124    6/1964    Atherton _____ 320—1

BERNARD KONICK, *Primary Examiner.*

IRVING L. SRAGOW, *Examiner.*

J. BREIMAYER, G. LIEBERSTEIN,
                                *Assistant Examiners.*